Oct. 6, 1942.    R. A. GOEPFRICH    2,298,008
BRAKE
Filed June 10, 1940
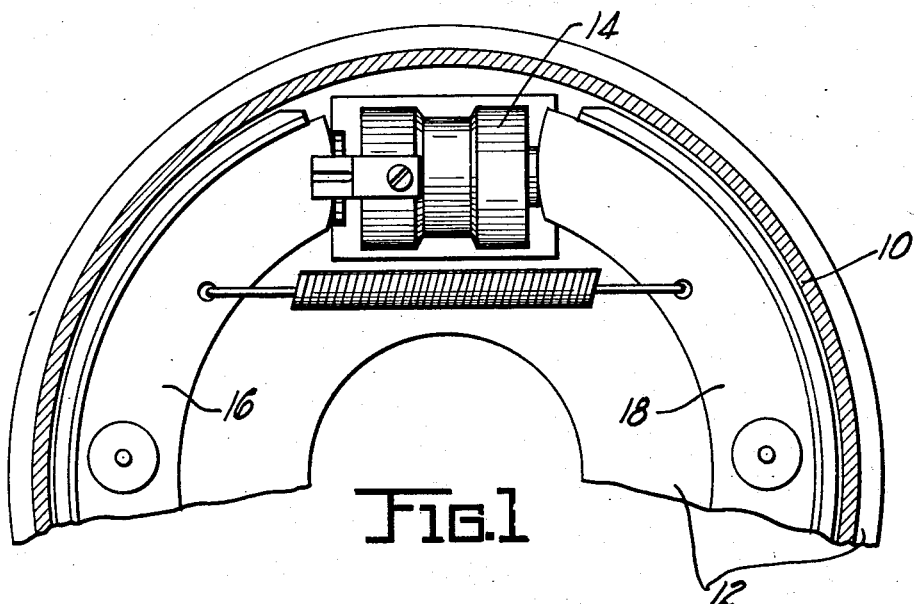
Fig.1
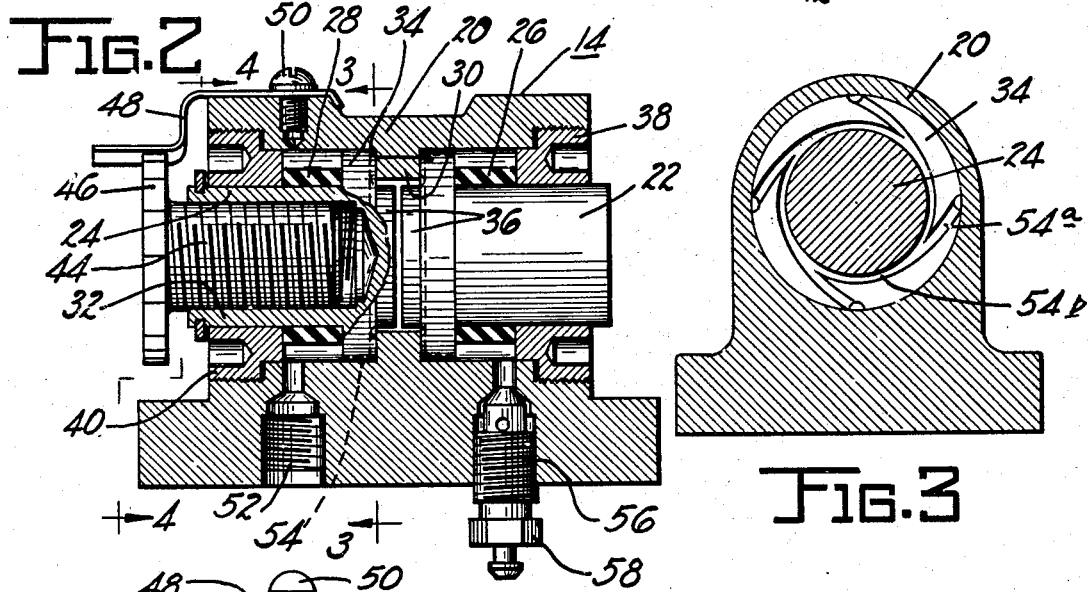
Fig.2
Fig.3
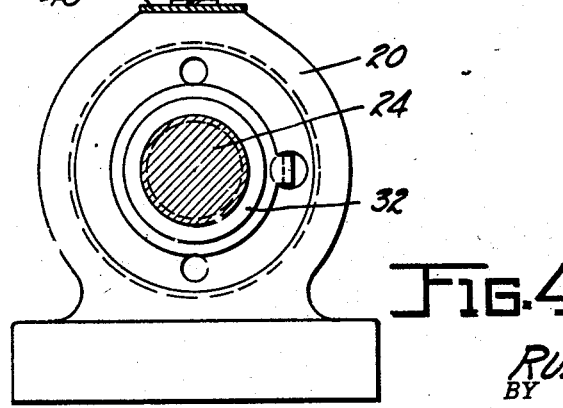
Fig.4
INVENTOR
RUDOLPH A. GOEPFRICH
BY
M. W. McCauley
ATTORNEY Patented Oct. 6, 1942

2,298,008

UNITED STATES PATENT OFFICE 2,298,008

BRAKE

Rudolph A. Goepfrich, South Bend, Ind., assignor to Bendix Aviation Corporation, South Bend, Ind., a corporation of Delaware Application June 10, 1940, Serial No. 339,611

7 Claims. (Cl. 60—54.6)

This invention relates to fluid sealing means, and will be illustrated as embodied in the seal for a hydraulic cylinder in a hydraulic braking system.

The objects of my invention are to provide a sealing means of such nature that all danger of pinching the seal between the piston and cylinder wall will be eliminated, to provide a seal which will be positive in its sealing action, and to eliminate the wear of the cup type of seal caused by sliding of the cup along the cylinder wall during brake applying and releasing movements. Because there will be no danger of pinching the seal between the piston and the cylinder wall, the machining of these parts will not need to be done as carefully as has heretofore been the case, and manufacturing costs will consequently be lowered.

Further objects and desirable particular features of my invention will be apparent from tthe following description, during the course of which reference will be had to the accompanying drawing, in which:

Figure 1 is a section showing the upper portion of a wheel brake assembly, the section being taken from a plane just inside the head of the brake drum, showing the brake shoes in side elevation;

Figure 2 shows a horizontal section through the center of the hydraulic wheel cylinder which is shown in Figure 1 and which incorporates my improved sealing means;

Figure 3 is a section taken on the line 3—3 of Figure 2, and

Figure 4 is a section taken on the line 4—4 of Figure 2.

The brake of Figure 1 comprises a rotatable brake drum 10, and a non-rotatable brake applying assembly including a stationary backing plate 12, a novel hydraulic wheel cylinder 14 secured to the backing plate, and brake shoes 16 and 18 mounted on the backing plate and arranged to be moved by actuation of the hydraulic cylinder into contact with the brake drum.

The hydraulic wheel cylinder 14 comprises a cylinder wall 20, a pair of pistons 22 and 24 reciprocable therein, and a pair of sealing elements 26 and 28 for preventing escape of pressure fluid from the cylinder. An annular inwardly extending flange 30 on the cylinder wall serves as an abutment against which the pistons rest in their innermost, or brake released, position. The pistons 22 and 24 each comprise a body portion 32 and a head 34 of greater diameter than the body portion, and projections 36 forward of the head. The heads of the piston are arranged to rest against the flange 30 when the brakes are released, the projections 36 extending into the cylindrical opening formed by the inner side of the flange. The outer ends of the cylinder wall 20 are internally threaded, and screwed therein are a pair of externally threaded annular plugs 38 and 40. Washers 42 are provided between the plugs 38 and 40 and the flanges on the cylinder wall against which the plugs are moved. An internally threaded recess in the piston 24 receives an adjustment screw 44 which has on its outer end a ratchet wheel 46. A thin metal piece 48 is fastened to the cylinder wall by means such as a bolt 50 and serves as a lock for the adjusting ratchet 46.

A fluid inlet 52 connects the usual hydraulic line to the interior of the cylinder 14. It will be noted that a series of passages are provided in the heads 34 of the pistons 22 and 24 (see Figure 4). This series of passages in each case comprises a plurality of axial passages 54, a plurality of radial passages 54a, and a circular passage 54b, the said circular passage being in communication with the interior of the cylinder between the heads of the two pistons, and being connected by means of the radial and axial passages to the interior of the cylinder on the left and right sides respectively of the head of the piston 24 and of the head of the piston 22. Fluid entering the cylinder 14 on the chamber to the left of the flange 30 may therefore pass through passages 54, 54a and 54b of the piston 24, around the edges of the extensions 36 on the pistons 22 and 24, and through the passages 54, 54a and 54b in the head of the piston 22 into the chamber which is on the right hand side of the flange 30. A bleed opening 56 is provided in the cylinder wall, and a bleeder screw 58 is inserted therein.

The sealing elements 26 and 28 are annular in shape, are substantially rectangular in cross section, and are made of some suitable resilient material such as rubber or neoprene. When the parts of the cylinder 14 are assembled, the sealing elements 26 and 28 are pressed around the body portions of the respective pistons, and are under compression between the heads 34 of their respective pistons and the inner ends of their respective plugs 38 and 40. The net result of the assembling operation is therefore to provide a tight fit on three sides of the sealing elements, one side being pressed against the inner end of the piston head, one side being pressed against the cylindrical surface of the body of the piston, and the third side being pressed against the inner end of the plug which is screwed into the cylinder wall at the end thereof. Since pressure fluid is admitted to the spaces on either side of the flange 30, the pressure pressed on the fluid during brake application will tend to force the seals against the cylindrical surfaces of the body portions of their respective pistons.

It will be obvious that the force of fluid under pressure into the wheel cylinder 14 will act on the heads 34 of the pistons 22 and 24 forcing the said pistons apart to spread the brake shoes 16 and 18 and apply the brakes. During this brake applying movement of the pistons, the sealing elements 26 and 28 will be under increasing compression. The effect of this increasing force will be to effectively seal the hydraulic cylinder and prevent the escape of pressure fluid. Owing to the resiliency of the sealing elements 26 and 28, release of the brakes with the accompanying lessening of the hydraulic pressure will allow the said sealing elements to assume their original shape.

My invention has therefore accomplished its purpose of sealing without causing the sealing elements to slide along the surfaces of the piston wall; the sealing is positive inasmuch as the sealing elements are initially compressed between the piston head and the associated plug; and the danger of pinching the sealing means between the piston and the cylinder wall has been entirely eliminated.

While I have described a particular embodiment of my invention, it is not intended that the said invention be limited in scope to that embodiment or that it be limited otherwise than by the terms of the appended claims.

I claim:

1. A hydraulic cylinder comprising a cylinder wall, a pair of plugs at the ends thereof, a pair of pistons reciprocable in the cylinder and each having a body portion slidable through one of the plugs and a head portion of larger diameter than the body portion, and a pair of resilient sealing elements in compression between the heads of the pistons and the plugs, each of said sealing elements having the form of a hollow cylinder with its inner cylindrical surface lying along the outer cylindrical surface of the respective piston body.

2. A hydraulic actuator comprising a cylinder, a piston therein having a body portion and a head portion of greater diameter than the body portion and having passages through the head portion, a plug partially closing one end of the cylinder and having an opening through which the body portion of the piston extends, and a sealing element between the head of the piston and the plug.

3. A hydraulic actuator comprising a cylinder, a piston therein having a body portion and a head portion of greater diameter than the body portion and having passages through the head portion, a plug partially closing one end of the cylinder and having an opening through which the body portion of the piston extends, and a sealing element which is under compression between the head of the piston and the plug when the piston is moved relative to the cylinder.

4. A hydraulic actuator comprising a cylinder, a piston therein having a body portion forming a chamber with the cylinder wall and having a head portion with passages therethrough connecting the aforesaid chamber to the interior of the cylinder beyond the piston head, a plug partially closing one end of the cylinder and having an opening through which the body portion of the piston extends, a sealing element in the chamber between the head of the piston and the plug, and fluid means for forcing the head of the piston in the direction of the plug and for simultaneously exerting pressure on the sealing element.

5. A hydraulic actuator comprising a cylinder, a piston therein having a body portion and a head portion of greater diameter than the body portion and having passages through the head portion, means partially closing one end of the cylinder, a sealing element which is under compression between the head of the piston and the closing means when the piston is moving relative to the cylinder, and fluid means for so moving the piston and for simultaneously exerting a sealing pressure against the sealing element.

6. A hydraulic actuator comprising a cylinder wall having a fluid inlet therethrough and having a centrally located inwardly extending flange, a piston reciprocable in the actuator, said piston having a body portion forming with the cylinder wall an annular chamber which is connected to the fluid inlet and said piston having a head portion with passages therethrough connecting the annular chamber to the cylinder interior adjacent the inwardly extending flange, a plug partially closing one end of the cylinder and having an opening through which the body portion of the piston extends and an annular sealing element in the aforementioned chamber under compression between the piston head and the plug.

7. A hydraulic actuator comprising a cylinder having a centrally located inwardly extending flange, a pair of pistons reciprocable in the cylinder one on each side of the flange, said pistons having body portions forming annular chambers with the cylinder walls and having head portions adapted to rest against the cylinder flange, said head portions having passages therethrough connecting the annular chambers to one another through the center of the cylinder, sealing elements in the annular chambers and encircling the piston bodies, said sealing elements being compressed between the piston heads and the outer ends of the cylinders when the pistons are spread, and fluid means for spreading the pistons and for simultaneously exerting pressure against the sealing elements to hold them in closer relationship against the bodies of the pistons.

RUDOLPH A. GOEPFRICH.